United States Patent [19]

Karrai

[11] Patent Number: 5,641,896
[45] Date of Patent: Jun. 24, 1997

[54] COUPLED OSCILLATOR SCANNING IMAGER

[75] Inventor: Khaled Karrai, Munich, Germany

[73] Assignee: Dr. Khaled Karrai und Dr. Miles Haines Gesellschaft burgerlichen Rechts, Munich, Germany

[21] Appl. No.: 395,089

[22] Filed: Feb. 27, 1995

[30] Foreign Application Priority Data

May 11, 1994 [GB] United Kingdom ............... 9409414

[51] Int. Cl.$^6$ ............................. G02B 21/00; G01L 5/00
[52] U.S. Cl. ................................ 73/105; 250/306
[58] Field of Search ....................... 73/105; 250/306

[56] References Cited

U.S. PATENT DOCUMENTS

| | | | |
|---|---|---|---|
| 4,343,993 | 8/1982 | Binnig et al. ............................ | 250/306 |
| 5,105,305 | 4/1992 | Betzig et al. . | |
| 5,212,987 | 5/1993 | Dransfeld et al. ........................ | 73/579 |
| 5,280,341 | 1/1994 | Nonnemacher et al. ........... | 250/306 X |
| 5,467,642 | 11/1995 | Hosaka et al. ........................... | 73/105 |

FOREIGN PATENT DOCUMENTS

| | | | |
|---|---|---|---|
| 0 112 401 | 7/1984 | European Pat. Off. ........ | G02B 21/00 |
| 394962 | 10/1990 | European Pat. Off. . | |
| 422548 | 4/1991 | European Pat. Off. . | |
| 0 487 233 | 5/1992 | European Pat. Off. . | |
| 0 545 538 | 6/1993 | European Pat. Off. ........ | G01B 7/34 |
| 0 587 459 | 3/1994 | European Pat. Off. ........ | G01B 7/34 |

OTHER PUBLICATIONS

Toledo–Crow et al Applied Physics Letters, vol. 60, No. 24 pp. 2957–2959 (1992) (American Institute of Physics).
Betzig et al Applied Physics Letters, vol. 60, No. 20 pp. 2484–2486 (May 1992) (American Institute of Physics).
Tortonese et al Applied Physics Letters, vol. 62, No. 8 pp. 834–836 (Feb. 1993) (American Institute of Physics).
Tansock and Williams Ultramicroscopy, vol. 42–44, pp. 1464–1469 (1992) (Elsevier Science Publishers).

Patent Abstracts of Japan, JP–A–3–167744, E–1123, vol. 15, No. 408 (Oct. 17, 1991).
Akamine, S., et al., "Microfabricated Scanning Tunneling Microscope," *IEEE Electron Device Letters*, vol. 10, No. 11, pp. 490–492 (Nov. 1989).
Buckland, E.L., et al., "Resolution in Collection–Mode Scanning Optical Microscopy," *Journal of Applied Physics*, vol. 73, No. 3, pp. 1018–1028 (Feb. 1, 1993).
Clayton, L., et al., "Miniature Crystalline Quartz Electromechanical Structures," *Sensors and Actuators*, vol. 20, pp. 171–177 (1989).
Grober, R., et al., "Design and Implementation of a Low Temperature Near–Field Scanning Optical Microscope," *Review of Scientific Instruments*, vol. 65, No. 3, pp. 626–631 (Mar. 1994).
Itoh, T., et al., "Piezoelectric Sensor for Detecting Force Gradients in Atomic Force Microscopy," *Japanese Journal of Applied Physics*, vol. 33, Pt. 1, No. 1A, pp. 334–340 (Jan. 1994).

(List continued on next page.)

*Primary Examiner*—Thomas P. Noland
*Attorney, Agent, or Firm*—Watts, Hoffmann, Fisher & Heinke, Co. L.P.A.

[57] ABSTRACT

A scanning probe microscope, in particular for near-field scanning optical, friction force and atomic force microscopy, comprises a tip piece attached to an oscillator of piezoelectric material. This oscillator is coupled to a further oscillator thereby forming a coupled oscillator arrangement. In a most preferred embodiment, the coupled oscillator arrangement is a quartz piezoelectric tuning fork. In use, the tip piece is vibrated relative to the sample. Tip-sample interaction strains the piezoelectric material and is measurable via contacts placed on the piezoelectric material which are responsive to the strain-induced piezoelectric charge. The coupled oscillator arrangement allows a large Q of several thousand or more to be realized. The microscope is easy to operate due to the purely electrical signal collection. The probe head can operate in vacuum, at cryogenic temperatures or in high magnetic fields.

24 Claims, 14 Drawing Sheets

OTHER PUBLICATIONS

Pohl, D.W., et al., "Optical Stethoscopy: Image Recording with Resolution $\lambda/20$," *Applied Physics Letters*, vol. 44, No. 7, pp. 651–653 (Apr. 1, 1984).

Sasaki, A., et al., "Scanning Shearing–Stress Microscopy of Gold Thin Films," *Japanese Journal of Applied Physics*, vol. 33, Pt. 2, No. 4A, pp. L 547 –L 549 (Apr. 1994).

Takata, K., "Whole Electronic Cantilever Control for Atomic Force Microscopy," *Review of Scientific Instruments*, vol. 64, No. 9, pp. 2598–2600 (Sep. 1993).

Betzig, E., et al., "Breaking the Diffraction Barrier: Optical Microscopy on a Nanometric Scale," *Science*, vol. 251, pp. 1468–1470 (Mar. 22, 1991).

COUPLED OSCILLATOR SCANNING IMAGER

FIELD OF THE INVENTION

The invention relates to a scanning probe microscope (SPM). The invention also relates to ways of using a scanning probe microscope in accordance with the invention. Moreover the invention relates to a method of manufacturing a scanning probe microscope in accordance with the invention.

The SPM of the invention is especially well suited for use as a near field microscope (NSOM), an atomic force microscope (AFM), a friction force microscope (FFM), or as an SPM capable of being used in two or more of the above modes either simultaneously (parallel) or in sequence (serial). The most preferred combination is parallel NSOM and FFM.

ART BACKGROUND

The first scanning probe microscope was the Nobel prize winning scanning tunneling microscope (STM) of Binnig and Rohrer described for instance in U.S. Pat. No. 4,343,993. Since this original design, a whole family of scanning probe microscopes has grown up. Notable members are the AFM in which the atomic force between tip and sample is measured as opposed to the tunneling current in the STM; the NSOM, described for instance in EP-A-0112401, in which a waveguide tip, usually the tip of an optical fiber, measures optical coupling between tip and sample; and the FFM in which a force arising from coupling between tip and sample due to the presence of a liquid or gaseous viscous medium such as water or air respectively.

The present invention relates to scanning probe microscopes of the type in which the tip is vibratable relative to the sample. Typically, the tip or sample is set into periodic motion by a driver means, omen referred to in the art as a dither and sometimes as a wobbler. The tip-sample coupling is measured by its effect on one or more of the vibrational properties of the tip. Known methods of measuring the tip-sample interaction are through changes in the frequency of vibration of the tip, changes in the amplitude of vibration of the tip, and changes in the phase of vibration of the tip.

In U.S. Pat. No. 4,851,671 the frequency of the vibration of the tip is measured by electrical means. The tip is secured to a piezoelectrical crystal which is driven at one of its natural resonance frequencies, thus setting the tip into oscillatory motion normal to the surface of the sample by excitation of a shear mode of the piezoelectric crystal. Tip-sample interaction changes the frequency of vibration of the tip and results in feedback into the driver circuit. This frequency change of the driver circuit is then measured with standard electronic counting means.

Toledo-Crow et al disclose a scanning probe microscope in Applied Physics Letters, volume 60, pages 2957 to 2959 (1992) which measures changes in the amplitude of the tip vibration. This has the advantage of offering an intrinsically more rapid measurement than measurement of the frequency since alterations in the damping, i.e. the magnitude of the vibration can, in principle, be measured instantaneously. Toledo-Crow et al use optical means to measure the vibrational amplitude. This optical means comprises a laser source, a Wollaston prism, a beam splitter, an objective lens, a polarisation analyser and a light detector. I have built an apparatus following the design of Toledo-Crow et al and have found it to be accurate, rapid and quite sensitive.

However, despite these advantages, it is quite complicated to build, it is costly, it takes up a considerable amount of space and also requires alignment of the optical components. Additionally this alignment can be disturbed by mechanical shocks. Due to the alignment required, it is difficult to operate such an apparatus in a completely automated manner as required for instance in a satellite, in a hazardous environment such as a nuclear reactor, in a vacuum chamber, or in a cryostat and as desired in a commercial turnkey system. The spatial requirements of the apparatus can also be a problem in some applications, for instance it would not be easy to design an apparatus of this kind for use in the limited sample space of a magnet cryostat. A further consequence of the size and alignment requirements, is that, in order to build up an image, it is the sample which must be tastered since rastering the tip would necessitate rastering the whole optical set-up which would be impractical. This is not important for some samples, but can be a problem for large or heavy samples, such as mechanical work pieces, or samples which cannot be kept still, such as living organisms or plant matter.

Another apparatus which uses optical means to measure the vibration of the tip is described by Betzig et al in Applied Physics Letters, volume 60, pages 2484 to 2486 (1992). Embodiments are disclosed which not only measure the amplitude and/or phase of the vibration. The apparatus of Betzig et al has similar advantages and disadvantages to that of Toledo-Crow et al.

It has thus been recognized in the art that the optical external deflection sensors which are particularly prevalent in cantilever AFM designs (see for instance EP-A-0 422 548 and EP-A-0 394 962) work very well but, when used, make up a large part of the complexity, size and cost of the instrument. There is therefore a recognised want for simpler, less costly sensing means with at least comparable sensitivity. In particular, the piezoelectric effect has been used, not only in the above-mentioned U.S. Pat. No. 4,851,671 but also by Tortonese et al in Applied Physics Letters, volume 62, pages 834 to 836 (1993) and by Tansock and Williams in Ultramicroscopy, volume 42 to 44, pages 1464 to 1469 (1992).

Tortonese et al use a piezoresistive effect whereby the cantilever arm of an AFM is made of piezoelectric material and bending of the cantilever arm by the tip-sample interaction changes the resistance of the cantilever arm. This approach has proved to work well but the sensor is restricted to DC operation since there is no inverse piezoresistive effect, i.e. one cannot apply a resistance to strain the cantilever arm. Consequently, this approach is not suitable for scanning probe microscopes of the initially named kind.

Tansock and Williams describe a cantilever suitable for an AFM in which the cantilever is also made of piezoelectric material but in the form of a bimorph. This cantilever is therefore vibratable and hence suitable for use in a scanning probe microscope of the initially named kind by applying an AC voltage across either half of the bimorph.

However, the Q-factor of a simple cantilever, i.e. of a single beam, is typically poor, having for example a value of only Q=7 in the above publication.

Dransfeld et al in U.S. Pat. No. 5,212,987 disclose an acoustic scanning microscope using a piezoelectric tuning fork. The tuning fork is driven so that the oscillation of its prongs generate acoustic waves. The tuning fork needs to be aligned relative to the sample to be measured such that the direction of oscillation of the prongs is inclined either perpendicular to or with a significant component perpendicular to the sample surface. Acoustic waves then pass through the air, or another fluid medium which can support acoustic waves, and reflect from the sample surface and then return to the tuning fork and cause feedback. In this way the oscillations of the tuning fork are sensitive to the topography and acoustic properties of the sample surface and an image can be built up.

The acoustic scanning microscope also has the restriction that the signal is highly dependent on the acoustic medium, there being for example a strong pressure dependency of the characteristic. In vacuum the method cannot work at all as no acoustic waves are supported. In liquid mediums such as liquid helium it is not clear whether such a technique would be practical and what effects, for instance, the superfluid phase transitions would have. Moreover, due to the wavelength of acoustic waves, the technique is limited to a best resolution across the sample surface of approximately 50 nanometers.

It is thus an object of the present invention to provide a scanning probe microscope, wherein changes in the vibration of the tip are measurable by means which do not require optical or mechanical alignment, wherein changes in the vibrational state of the tip can be made rapidly, accurately and to a high degree of sensitivity, wherein the probe head is compact and light, wherein the probe head is rugged, wherein the SPM is operable in hostile and confined environments, such as in cryostats or in a vacuum chamber, wherein the SPM is inexpensive relative to prior art SPMs of comparable performance, and/or wherein the Q-factor associated with the pick-up means of the SPM is easily selectable during manufacture to a desired value in the range of approximately $Q=10^2$ to $Q=10^6$.

SUMMARY OF THE INVENTION

The above objects are satisfied in accordance with the invention in a scanning probe microscope comprising: a tip piece for interaction with a sample; first displacement means for providing relative movement of the tip piece towards and away from the sample in a first direction (y); second displacement means for providing relative movement of the tip piece across the sample in a plane (x,z) substantially perpendicular to said first direction (y); dither means for setting the tip piece into oscillation relative to the sample substantially in a plane (x, z) perpendicular to said first direction (y); a coupled oscillator arrangement comprising a first oscillator means and a second oscillator means coupled thereto, with said first oscillator means being a first portion of piezoelectric material extending in said first direction (y) having a first end held to a block and a second end remote said block connected with the tip piece, the tip piece extending in said first direction (y) beyond said second end of the first portion of piezoelectric material; pick-up means for obtaining an electrical signal responsive to said interaction with said sample from the coupled oscillator arrangement.

For SPMs of the initially named kind which dither or vibrate the tip piece in operation, the tip piece or some other cooperating member or circuit forms an oscillator. The quality factor or Q-factor of this oscillator is an important parameter for the performance of the SPM as discussed above in relation to the prior art. By the provision of a coupled oscillator arrangement in accordance with the invention, the Q-factor can be dramatically increased, and as will be described in more detail below, can be readily manufactured to pre-calculated optimal design values over a wide range.

Some of the advantages of the scanning probe microscope of the invention are now briefly mentioned. The signal is purely electrical and therefore very easy to collect and process. The instrument is very sensitive. The signal responds very quickly to changes in the vibrational frequency, amplitude and phase of the tip piece. The absence of optical components associated with the pick-up means and the fact that no optical access to the tip piece is required results in a very compact design of the probe head, where probe head is used here as a collective term for those components of the SPM which need to be in close proximity and/or rigid association with the tip piece.

The design of the SPM of the invention results in the probe head (i.e. that part of the scanning probe microscope which is physically scanned with the tip piece over the sample, for example in one preferred embodiment tip piece, tuning fork and ceramic piezo dither block) being a small, robust component which can withstand hostile environments such as extremes of temperature.

Moreover, the nature of the design means that the probe head is a physically separate part of the SPM which is only linked to the remainder of the SPM by electrical leads, and, in the case of an NSOM, also optical coupling, typically an optical fiber. The electrical leads and optionally the optical fiber are flexible and non-lossy. Consequently, the probe head can be employed remote from the remainder of the SPM. For example, the probe head can be installed in a cryostat, including a magnet cryostat, in a vacuum chamber or in a separate radioactive environment. Conventional feed-outs from the cryostat, vacuum chamber etc. can be used to connect the probe head with the rest of the SPM.

For use as a scanning optical microscope, the tip piece is the end portion of an optical fiber and terminates in an optically transmissive aperture. For use as a near-field scanning optical microscope in particular it is preferable that the tip piece has a reflective coating around its optically transmissive aperture.

In particular for SPMs which will only be used in AFM or FFM modes, the SPM can be made so that the tip piece is integral with the first portion of piezoelectric material. For instance, the first portion of piezoelectric material can be micro-machined or etched at one end in order to produce an elongate portion serving as the tip piece.

In an advantageous embodiment the first oscillator means is a bimorph, i.e. the first portion of piezoelectric material is subdivided into at least two connected parts with different piezoelectric characters. Typically there will be two connected elongate halves with proportions similar to a conventional bimetallic strip. The two halves will either be made of different materials or of the same material but connected together with different relative crystal orientations.

In the most preferred embodiments of the SPM of the invention, the second oscillator means is also made from a portion of piezoelectric material, namely the second portion of piezoelectric material. The second piece can of course also be a bimorph in a similar manner to that described above in relation to the first portion of piezoelectric material.

In the version of the SPM of the invention which I have used more extensively than any other to date and which appears to give very good results, the first and second oscillator means are formed by a tuning fork, the tuning fork having first and second prongs in the conventional manner. This is a particularly attractive design from the practical and commercial point of view since the technology associated with tuning forks, in particular quartz tuning forks used in the watch industry, is very mature. In particular, such tuning forks produce an almost exactly defined frequency, are highly reliable and very cheap.

In another range of embodiments of the SPM of the invention, instead of using piezoelectric material to form both the first and second oscillator means, the second oscillator means is an oscillator circuit, typically be an electronic circuit. The oscillator circuit is then coupled to the first oscillator means either electronically, for example with a wire, or optoelectronically, for example by an optical fiber with associated semiconductor lasers and detectors acting as the optoelectronic convertors. It is noted that the oscillator circuit is not to be confused with an oscillator driver circuit such as that disclosed by U.S. Pat. No. 4,851,671 shown schematically in FIG. 1.

In a first design of the dither means in a SPM of the invention, the dither means is a physically separate component made out of piezoelectric material. Electrical leads are contacted to the piezoelectric dither block which is dithered, i.e. set into oscillatory motion, by applying an electrical dither drive input, such as a sinusoidally varying voltage from a standard signal generator. In this design of the dither means it is desirable that the piezoelectric dither block acts purely as a driving element and is not sensitive to the tip-sample interaction. Consequently, it is preferred in this design of the dither means that the piezoelectric material used for the dither means be ceramic, amorphous, polycrystalline or other similar material with poor mechanical oscillation properties, in particular over the frequency ranges used in operation. This will ensure that the dither block does not start to resonate in sympathy with a resonant oscillation of the mechanical parts of the coupled oscillator arrangement, for example with a resonance of the tuning fork.

In a second design of the dither means in a SPM of the invention, a separate dither block can be dispensed with. Instead of using a separate portion of piezoelectric material to provide dither, the existing portion of piezoelectric material of the first oscillator means is used. In this case the dither means is integral with at least the first portion of piezoelectric material and comprises at least one electrical contact arranged on at least the first portion of piezoelectric material. To produce dither an electrical signal analogous to that described above in relation to the first design of the dither means is applied. This electrical dither drive input deforms at least the first portion of piezoelectric material thus setting the tip piece into oscillatory motion in the manner desired. In embodiments in which first and second oscillator means are made of piezoelectric material, in particular tuning fork embodiments and twin-bimorph embodiments, it is preferred that the dither means comprises one electrical contact arranged on the first portion of piezoelectric material (e.g. on the first prong of the tuning fork) and another electrical contact arranged on the second portion of piezoelectric material (e.g. on the second prong of the tuning fork). This ensures that the dither drive acts symmetrically.

It is noted that in the first design, the dither means does not have to be part of the probe head. In other words, since it is only relative tip-sample motion which is required from the dither, the dither means can be used to dither the sample instead of the tip. In contrast, the second design of the dither means with integral dither and oscillator means does not lend itself to dithering the sample.

The invention also relates to different ways of using a scanning probe microscope of the invention.

In a first mode of use which is suitable for all embodiments of the SPM of the invention, in the absence of tip-sample interaction, the dither means sets the tip piece into oscillation relative to the sample at a dither frequency which is near to a resonance frequency of the coupled oscillator arrangement in a manner such that the coupled oscillator arrangement is responsive to the dither means, whereas, in the presence of tip-sample interaction, the coupled oscillator arrangement detunes so that said oscillations of the first and second oscillator means are disturbed thus changing the electrical signal obtained from the pick-up means.

In a second mode of use which is suitable for all the embodiments of the SPM of the invention which use the above-described first design of the dither means, in the absence of tip-sample interaction, the dither means sets the tip piece into oscillation relative to said sample at a dither frequency which is near to a resonance frequency of said coupled oscillator arrangement in a manner such that said coupled oscillator arrangement is not responsive to the dither means, whereas, in the presence of said interaction, said coupled oscillator arrangement responds to said oscillation produced by the dither means and rings thus changing said electrical signal obtained from said pick-up means. Thus this mode can be seen as representing the converse situation to the first mode, since the coupled oscillator only oscillates in the presence of tip-sample interaction. This second mode is particularly suited to embodiments in which the dither means drives the sample, but can also be used for embodiments in which the dither means drives the tip.

In a third mode of use which is suitable for the tuning fork embodiments of the SPM of the invention, in the absence of said interaction, the dither means sets the tip piece into oscillation at a dither frequency by driving the tuning fork at a frequency near to a resonance frequency of the tuning fork so that the first and second prongs of said tuning fork perform mutually opposed oscillations, whereas, present said interaction, the tuning fork detunes so that said mutually opposed oscillations of the first and second prongs are disturbed thus changing said electrical signal obtained from the pick-up means.

Particular problems can arise when manufacturing the SPM of the invention due to the coupled oscillator arrangement. Namely, as a result of the provision of a coupled oscillator arrangement it can arise that the Q-factor of the oscillator is higher than desired. The fact that it is not generally desirable to have as large a Q as possible is perhaps not immediately obvious but is explained in detail below in the specific description. As a result of the very high Q-factors which I routinely achieve in the laboratory, I have developed techniques of reducing the Q-factor to a pre-calculated optimum design value.

My invention thus also relates to a method of manufacturing a scanning probe microscope, characterized in that said coupled oscillator arrangement has a quality factor, and in that prior to connecting the first oscillator means to the tip piece, this quality factor is substantially higher than that which is ultimately desired after completion of manufacture of the scanning probe microscope, and in that, subsequent to connecting the first oscillator means to the tip piece, said quality factor is determined and then reduced by adjustment of at least a first controllable parameter until said quality factor is approximately equal to a predetermined desired value.

The first controllable parameter can be the addition of doses of extra material, such as adhesive bonding material, to the first portion of piezoelectric material and/or, if present, to the second portion of piezoelectric material.

For embodiments in which the second oscillator means is an oscillator circuit, in particular an electronic circuit, said first controllable parameter is a resistance, inductance and/or capacitance of an adjustable electrical device which forms part of said oscillator circuit, such as a potentiometer, a tunable inductor, and/or a varactor respectively.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The invention is now described by way of example only with the aid of figures which show:

FIG. 5A at rest; FIG. 5B oscillating in a resonance mode; and FIG. 5C off resonance;

FIG. 6A Twin bimorph NSOM/FFM;

FIG. 6B NSOM/FFM with the first oscillator means being made of a portion of piezoelectric material and the second oscillator means comprising an electrical oscillator circuit;

FIG. 7A tuning fork suitable for use with a separate dither block with one pair of contacts for the pick-up signal arranged on one face of the tuning fork (visible in the view on the fight hand side) and with an earth or ground contact arranged on the reverse face of the tuning fork (visible in the view on the left hand side);

FIG. 7B A tuning fork suitable for use with a separate dither block with one pair of interwoven contacts for the pick-up signal (but no ground contact) wherein the white regions indicate bare quartz and the two grey shades the two interwoven contacts;

FIG. 7C A tuning fork with integrated dither means. The tuning fork has one pair of contacts for the pick-up signal arranged on one face of the tuning fork (visible in the view on the right hand side) and an earth or ground contact arranged on the reverse face of the tuning fork (visible in the view on the left hand side) as in FIG. 7A. However, there are additionally two dither contacts for receiving the AC electrical dither drive input;

FIG. 8A Pick-up signal as a function of dither frequency in the absence of tip-sample interaction;

FIG. 8B Pick-up signal as a function of dither frequency for different levels of tip-sample drag force ('friction') showing the effect that tip-sample interaction has on the tip oscillation. Points are measured, lines are fits calculated from a driven harmonic oscillator model;

FIG. 8C Pick-up signal as a function of dither frequency showing the effect that bonding the tip piece onto the tuning fork has on the oscillator properties of the tuning fork. The fight-hand peak shows the tuning fork response prior to bonding the tip piece onto the tuning fork and the left-hand peak shows a similar response after bonding of the tip piece, i.e. in an assembled probe head.

FIG. 9A Topography image taken in FFM mode;

FIG. 9B Optical transmission image taken in NSOM mode;

DETAILED DESCRIPTION

Figure 1:
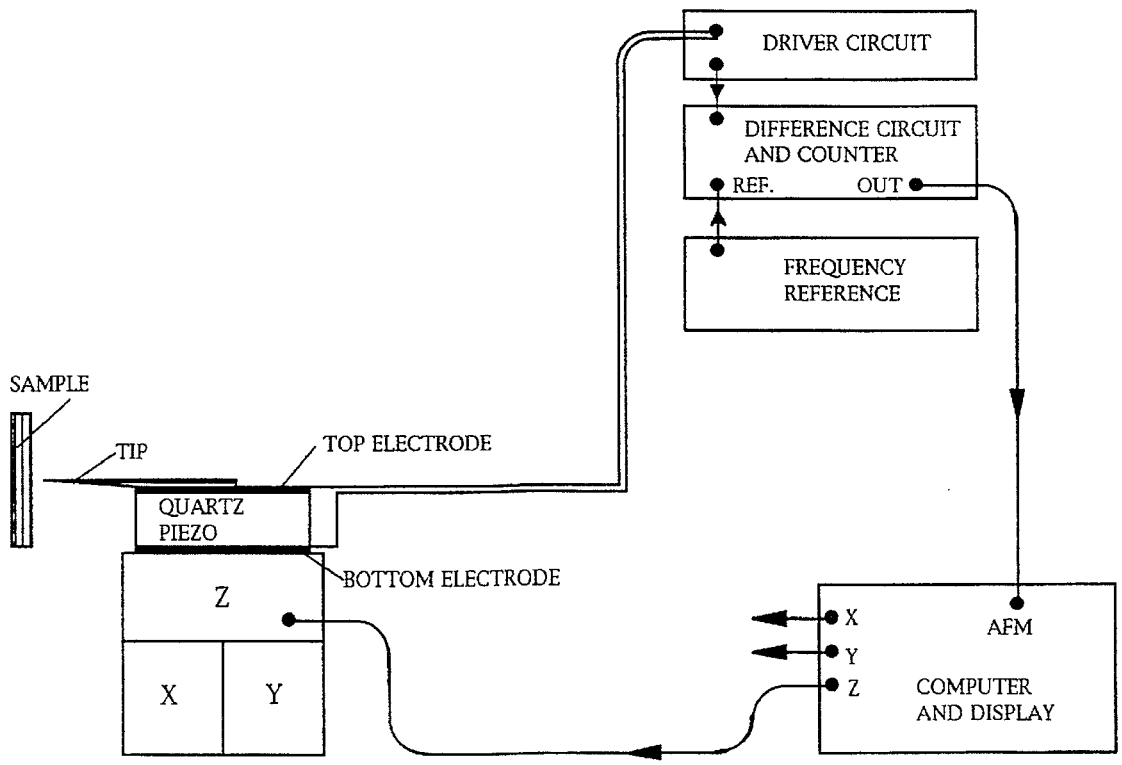
FIG. 1 Schematic block diagram of a prior art SPM in accordance with U.S. Pat. No. 4,851,671 which comprises electrical pick-up means.
Figure 2:
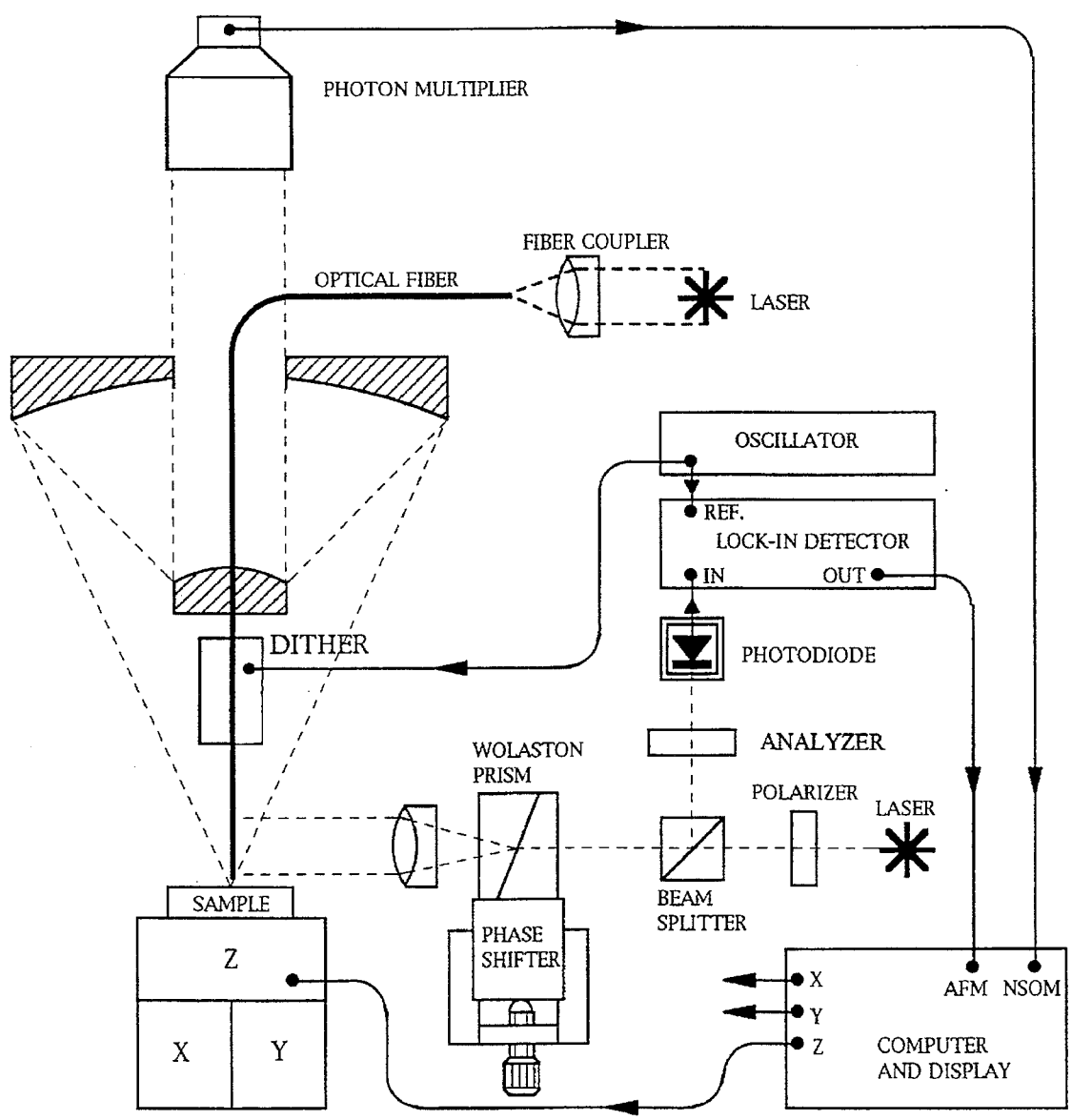
FIG. 2 Schematic block diagram of a prior art SPM in accordance with Toledo-Crow et al which comprises optical pick-up means.
Figure 3:
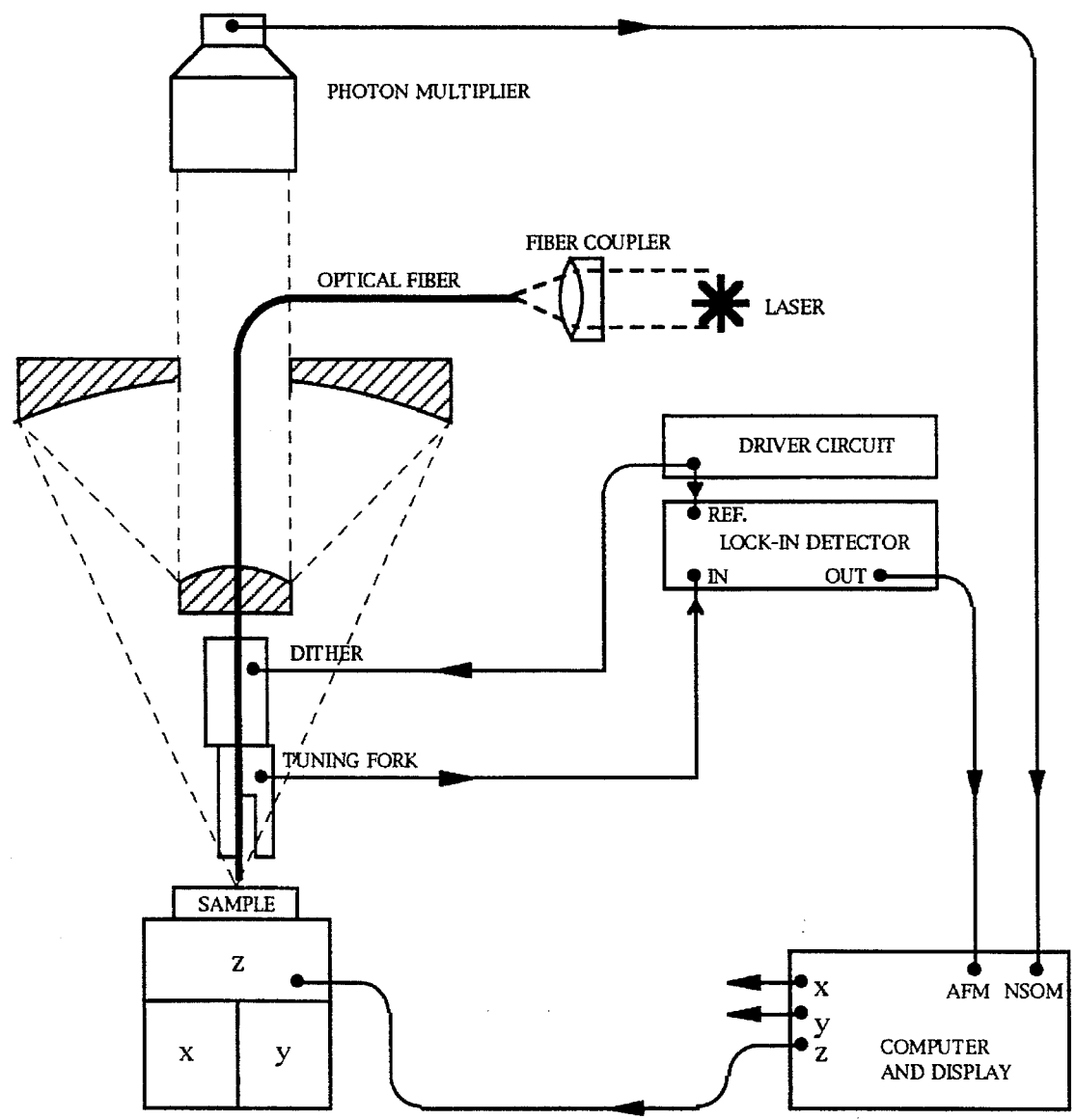
FIG. 3 Schematic block diagram of a SPM in accordance with the invention.
Figure 4:
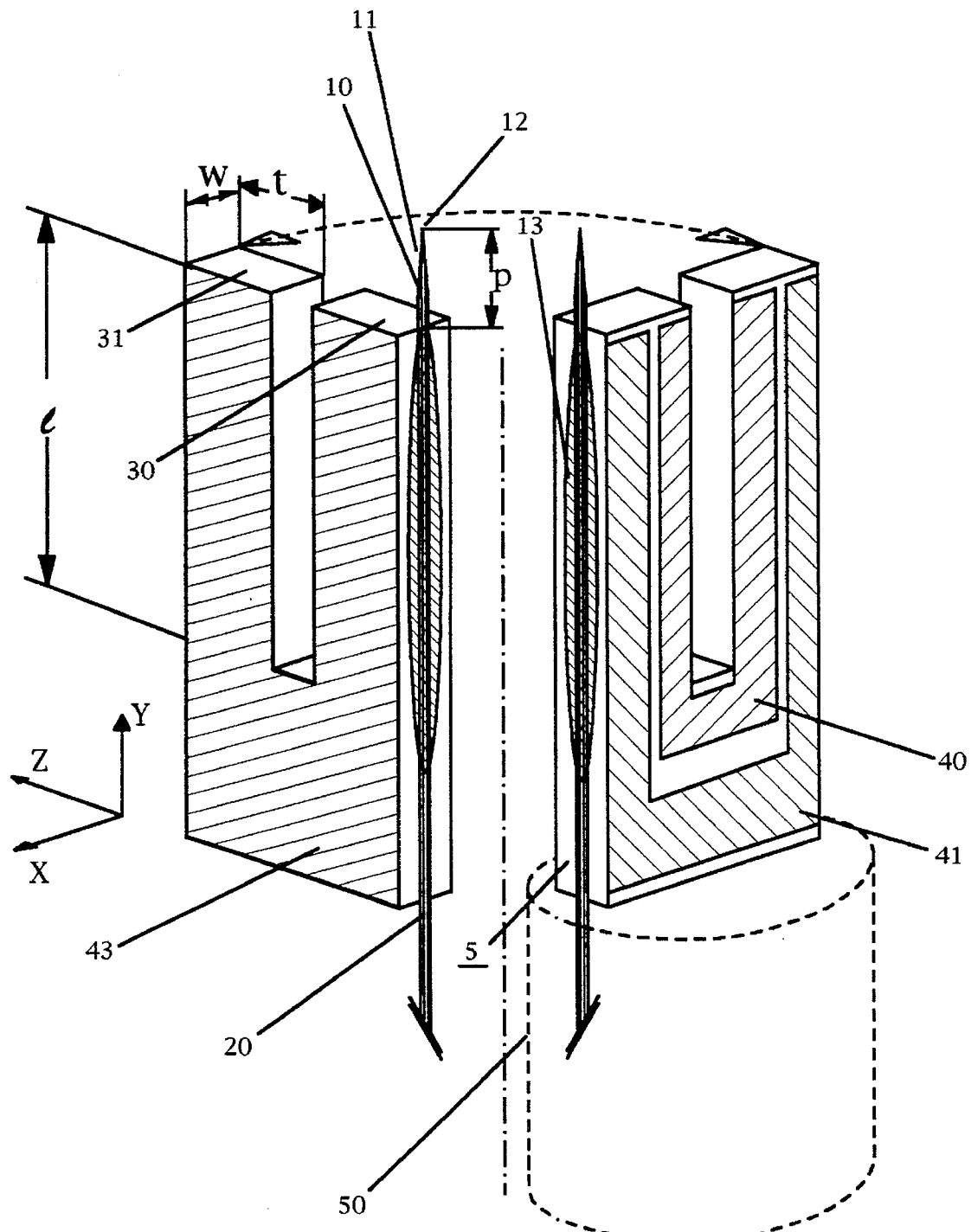
FIG. 4 Schematic close-up of the probe head of the SPM in accordance with the best mode of the invention with two views one rotated 90 degrees with respect to the other.

FIG. 4 shows the probe head in a first embodiment of the invention. A crystal quartz tuning fork 5 is attached to an optical fiber 20. The tuning fork 5 is attached to a cylindrically shaped dither block 50, shown by the dashed lines, made of ceramic piezoelectric material. The tuning fork 5 is a coupled oscillator with a first oscillator represented by the prong 30 and a second by the prong 31.

The end of the optical fiber 20 forms the tip piece 10. The tip piece 10 extends beyond the end of the tuning fork by a length 'p' which is typically chosen with a value of 0.5 to 1 millimeter. The tip piece 10 is preferably tapered in shape and has a narrow end. Tapering can for example be performed using standard optical fiber pulling techniques. The tip piece is preferably coated with a reflective layer of aluminum 11. The aluminum can be applied for example by using standard evaporation techniques. The end of the tip piece forms an optically transmissive aperture 12 through which the photons for near field optical microscopy can pass.

The optical fiber 20 is adhesively bonded along the length of one of side of the tuning fork with bonding means 13.

Contact Design

The tuning fork 5 has a pair of pick-up contacts 40, 41. In FIG. 4, and also FIG. 7A, the pick-up contacts 40, 41 are both arranged on one face of the tuning fork (visible in the view on the fight hand side) and an earth or ground contact 43 is arranged on the reverse face of the tuning fork (visible in the view on the left hand side).

Figure 7A:
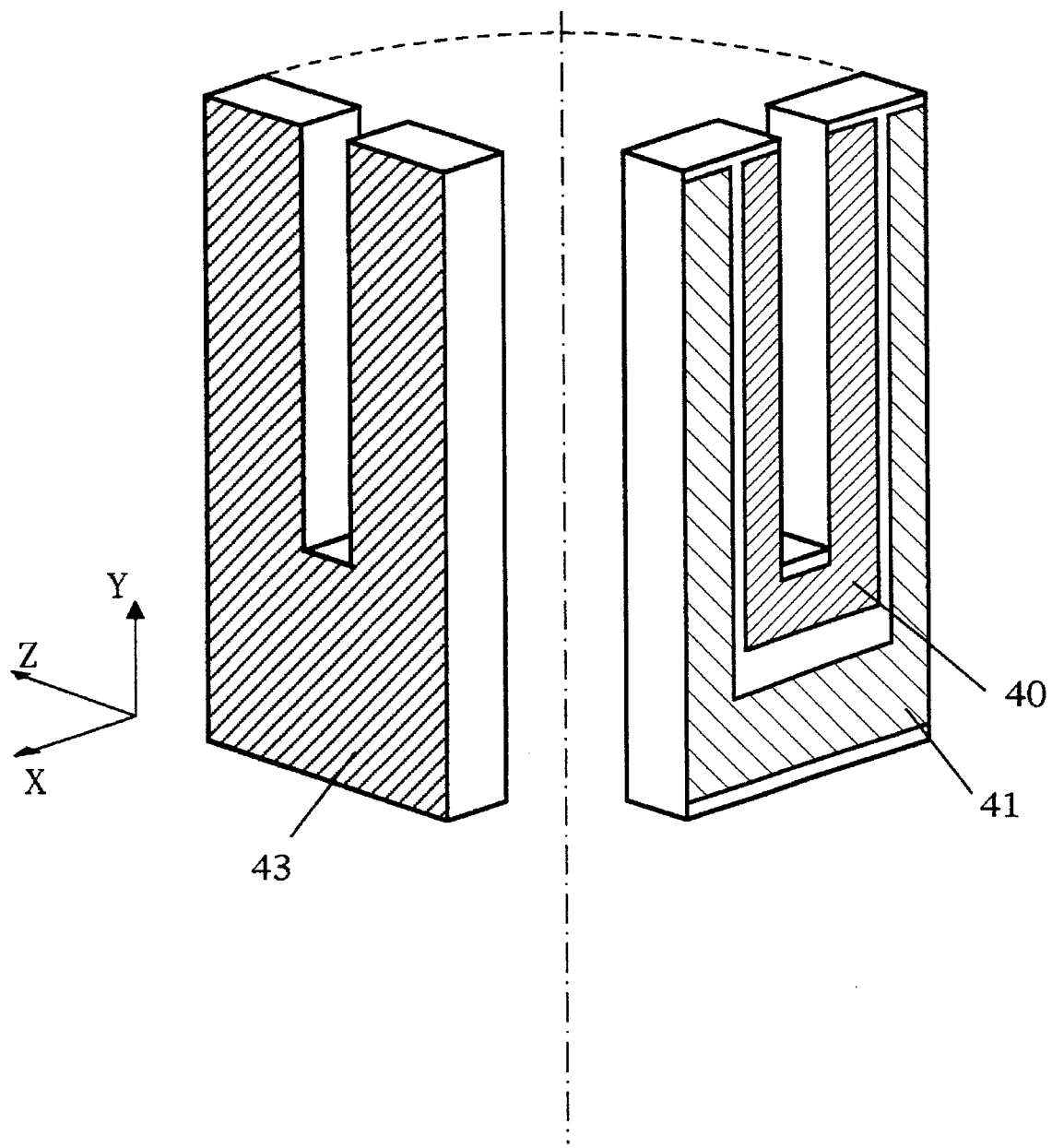
FIG. 7A, 7B, and 7C Schematic diagrams showing various tuning fork arrangements of the invention.
Figure 7B:
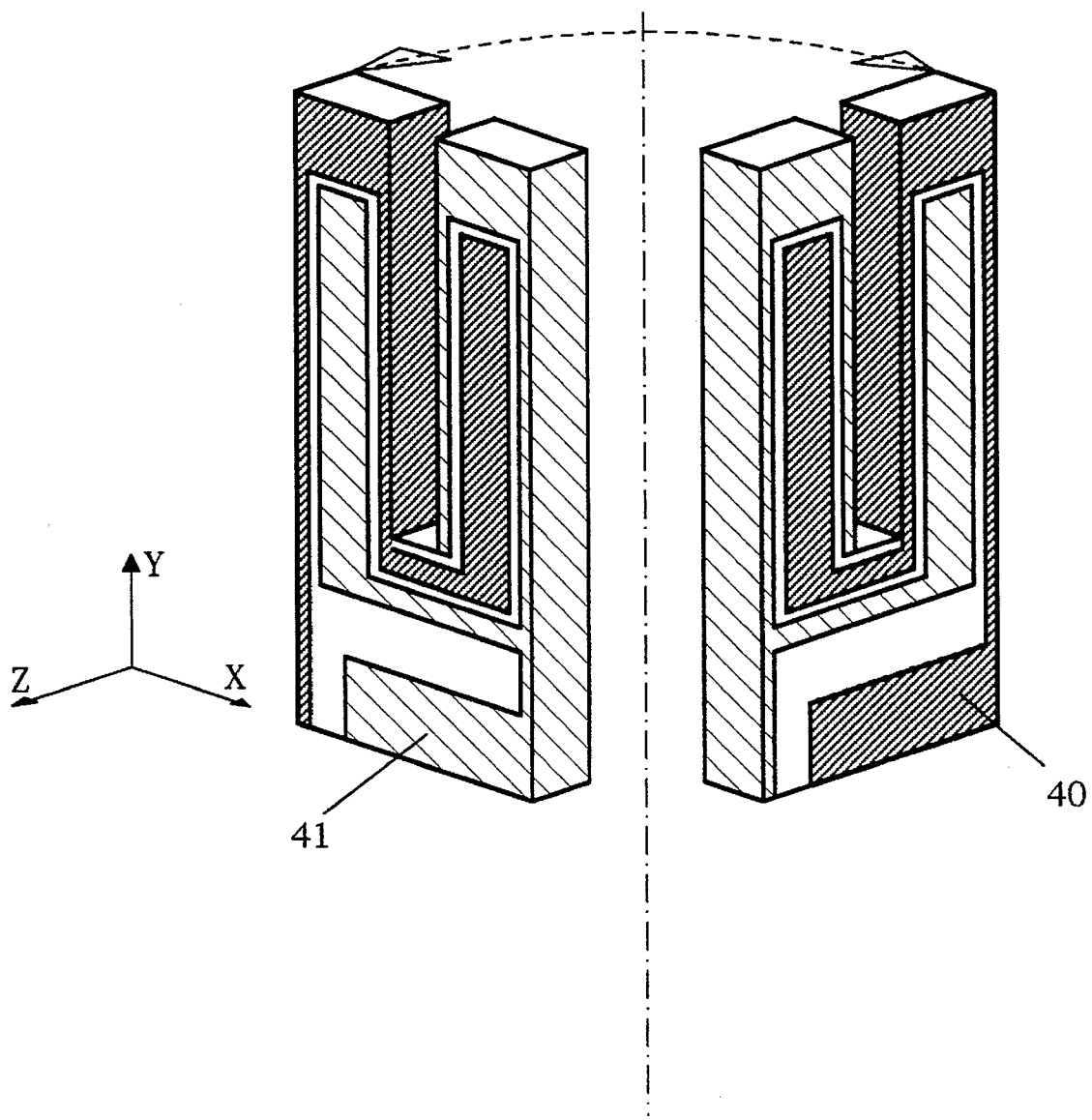

FIG. 7B shows one alternative arrangement for the contacts which is also suitable for a probe head with a separate ceramic dither block 50 of the type shown in FIG. 4. In this arrangement, the pick-up contacts 40, 41 extend onto both faces of the tuning fork through a rather intricate geometrical arrangement. The unshaded, white regions indicate bare quartz and the hatched regions the two interwoven contacts 40, 41. No ground contact 43 is provided. This contact arrangement is particularly efficient in converting deformation-induced piezoelectric charge into pick-up signal and is known from the electronics industry.

Figure 7C:
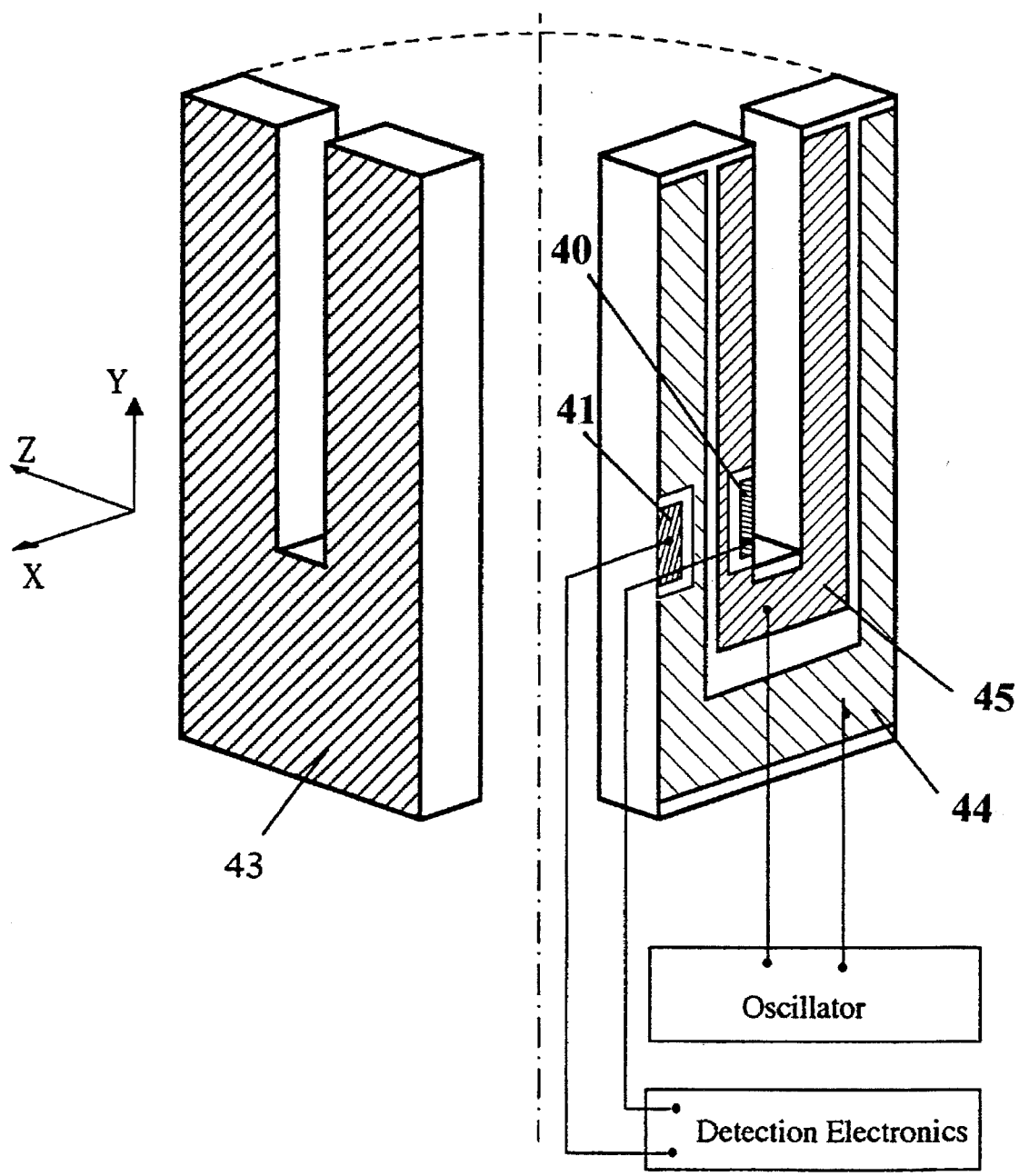

Another arrangement is shown in FIG. 7C in which two pairs of contacts are provided. Firstly, one pair of pick-up contacts 40, 41 and, secondly, one additional pair of contacts 44, 45. As explained below, these contacts 44, 45 actually represent the dither means with potential differences applied between contacts 44 and 45 resulting in deformation of the prongs of the tuning fork.

The pick-up contacts are arranged at the base of the prongs on the inner and outer sides respectively as these are the areas of maximum stress during vibration and thus deliver the largest pick-up signal. In other words the tuning fork performs a dual function in the dithering and sensing. The obvious advantage of this design is that a separate dither block as shown in FIG. 4 can be dispensed with, resulting in a yet compacter and simpler SPM. With this design it is desirable to keep the driving dither circuit and pick-up circuit as physically separate as possible in order to avoid capacitive coupling. The coupling between the circuits should be ideally purely piezoelectric.

Tuning Fork Design

The design of the tuning fork 5 itself is also very important for the performance of an SPM in accordance with the invention and is now discussed at length. Both the dimensions and the materials properties are important. An ideal tuning fork for SPM applications would have a high resonance frequency to allow rapid scanning of samples, a low compliance (i.e. spring constant) for its prongs, and produce a large piezoelectric response from a small deformation.

The parameters which enter into the design of a tuning fork for such applications are the dimensions of the prongs 30, 31, namely their length 'l', width 'w' and thickness 't', and the properties of the material used, namely its Young's (elastic) modulus 'E', density $\rho$, piezoelectric stress tensor $d_{ij}$, and crystal axes along which the tuning fork is formed.

If quartz is used, the directions X and Z shown in the figures represent the 'a' and 'c' axes of the hexagonal lattice basis of quartz (using conventional notation).

A convenient starting point for determining the dimensions of the tuning fork is to first select a desired value for the frequency 'f'. Typically a frequency of 10 to 100 kHz allows a good compromise between resolution and scanning speed, however, the choice is extremely dependent on the desired application.

For instance it may be acceptable to wait many hours for a single image in research applications, whereas a rapid measurement in minutes may be desirable for a commercial production environment. Moreover, the desired resolution of the image also varies hugely application to application. In some applications atomic resolution is essential, i.e. of the order of 0.1 nanometers, whereas for others, for instance the checking of integrated circuits in the semiconductor industry, the relevant size scale maybe 0.1 micrometers, that is 1000 times larger. Further, the overall size of a typical image may be very different so that the number of picture elements will also vary by orders of magnitude.

A desired compliance '$k_{eff}$' at resonance for the prongs should also be chosen. A value of '$k_{eff}$' of the order of 1 Newton per meter or lower is generally desirable. This value is chosen since the typical effective spring constant for atoms bound to a solid are of the order of 10 Newtons per meter and, at least for imaging applications, one does not want the tip to break atomic bonds in the solid. Such a value for '$k_{eff}$' also ensures that the tip remains atomically sharp when scanned over a sample surface and does not pick up 'fluff', i.e. atoms from the sample itself.

Using the theory of the elastic deformation of materials I have derived the following formulae:

$$l = \frac{1}{2\pi f} \left(4 \frac{k}{wE}\right)^{1/3} \sqrt{\frac{E}{\rho}}$$

$$t = \frac{1}{2\pi f} \left(4 \frac{k}{wE}\right)^{2/3} \sqrt{\frac{E}{\rho}}$$

where 'k' is the static compliance and is related to the previously mentioned '$k_{eff}$' by the relation $k_{eff} = k/Q$ where 'Q' is the Q-factor or sharpness of the resonance defined as the ratio $f/\Delta f$ between the resonance frequency 'f' and its width '$\Delta f$'.

It is clear from the above formulae that the length T is fixed by the materials parameters E and $\rho$ and the desired scanning properties f and k.

I now go on to discuss the other important factor, namely the electric field induced by deformation of the tuning fork. I have derived the following expression for the local electric field 'F'. This field has a value '$\delta F$' at each point (y,z) in the plane (Y,Z) defined by the contact electrodes 40, 41 which is given by the expression:

$$\delta F(y,z) = \frac{3}{\epsilon_0 \epsilon_s} d_{11} E \frac{(l-y)z}{l^3} \delta t$$

where '$d_{11}$' is the longitudinal piezoelectric constant of the crystal, '$\epsilon_0$' is the dielectric constant in vacuum and '$\epsilon_s$' the static relative dielectric constant of the piezoelectric material. I have assumed here that the piezoelectric crystal has trigonal or hexagonal symmetry but equivalent expressions can be derived in an analogous manner for other crystal types.

The pick-up signal voltage can now be approximated by the potential drop across the width 'w' occasioned by the electric field averaged under the whole area of each contact electrode and is given by:

$$\delta V = \frac{1.5}{\epsilon_0 \epsilon_s} d_{11} E \frac{wt}{l^2} \delta t$$

It can be seen from the above formulae that the width 'w' of the tuning fork can, to some extent, be chosen freely. In embodiments up to now, I have selected 'w' so that a typical dither-induced tip displacement of 0.1 nanometers results in an induced voltage in the microvolts range. A voltage of this order means that the pick-up signal remains easy to measure with standard instrumentation and is large enough that typical sources of interference do not cause any difficulties.

It is noted that the design formulae for other coupled oscillator arrangements, in particular those for which only a single portion of piezoelectric material are used can be readily derived in an analogous manner.

To give a feel for the parameters used, two examples are given below for probe heads incorporating tuning forks which are suitable for NSOM/FFM/AFM applications.

EXAMPLE 1

A quartz plate is selected with a thickness of 100 micrometers and an orientation of (XYt)-5°, as denoted with the IEEE standard notation on piezoelectricity ANSI/IEEE Standard 176 (1987). Such an orientation gives high signal sensitivity. A tuning fork shape is cut out of this quartz plate with the dimensions: w=100 micrometers, t=300 micrometers and l=2.75 millimeters. The materials parameters were taken to be $E=6\times10^{10}$ N/m$^2$, $\rho=2\,650$ kg/m$^3$ and $d_{11}=2.31\times 10^{-12}$ Coulomb per Newton.

The resulting tuning fork has a frequency, f=30 000 Hz and $k_{eff}$=1 N/m. Once the probe head is manufactured, specifically once the optical fiber is bonded to the tuning fork, a sharpness of Q=2000 was obtained. In general, use of the method of manufacture in accordance with the invention may be necessary to reduce Q to such a value after initial assembly of the probe head.

Note that it is the optical fiber 20 and not its tip piece 10 which is primarily responsible for the lowering of the Q-factor of the probe head in relation to the isolated tuning fork. Consequently, for AFM applications in which no optical fiber is necessary the probe head Q-factor approaches that of the bare tuning fork and can have a value of Q=10 000 or more in air.

The sensitivity of the tuning fork can be specified by the voltage induced on the contacts by an incremental deformation at the end of a prong of the tuning fork. The exemplary tuning fork has a value of $\delta V/\delta t$=93 millivolts per nanometer.

To give an idea of the practicality of such a response, a typical size of deformation at the end of the prongs produced by dithering is 5 picometers. This corresponds to an induced piezoelectric voltage at the contacts 40, 41 of approximately 10 microvolts. Note that I have assumed here that voltage is used as the pick-up signal as this is what I have done in most of my SPMs until now. However, other pick-up signals can be used, for instance impedance.

Figure 5A:
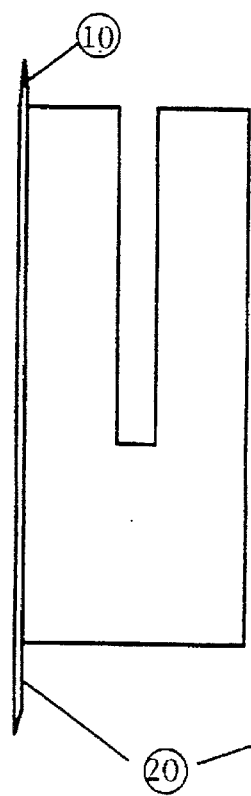
FIGS. 5A, 5B, and 5C Schematic and highly exaggerated figure showing the charge distribution in a piezoelectric tuning fork wherein the dash-dot lines represent the planes of zero strain.
Figure 5B:
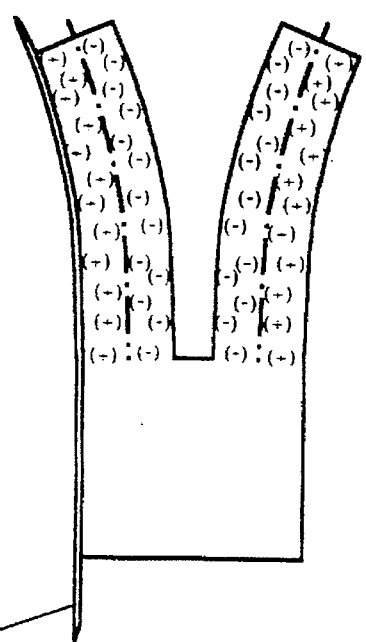
Figure 5C:
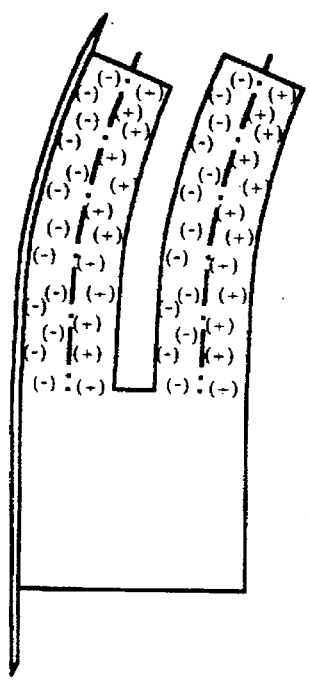

To appreciate the nature of the pick-up signal, FIGS. 5A, 5B, and 5C are referred to FIGS. 5A, 5B, and 5C show. In a highly exaggerated fashion, the piezoelectric induced charge distribution over the prongs of a tuning fork for different deformations. FIG. 5A shows the distribution for zero flexure, i.e. at rest. FIG. 5B shows the situation for equal and opposite flexure of the two prongs of the tuning fork such as occurs when the tuning fork is dithered at its primary resonance frequency. FIG. 5C shows the situation when the two prongs flex together.

When using for instance the contact arrangement of FIG. 7A, the pick-up signal is almost zero for equal and opposite flexure (FIG. 5B) as the contributions from the two contacts cancel. The pick-up signal then rises in response to non-mirror-symmetric deformation of the prongs 30, 31 such as occurs when tip-sample interaction damps the prong to which the tip piece is attached. That is to say, the signal is a measure of the differential flexure of the two prongs with such a contact arrangement with maximum signal arising for exactly like flexure of the prongs as shown in FIG. 5C. This mechanism is in fact the mechanism which couples the mechanical oscillations of the two prongs of the tuning fork which, in turn, is the origin of the high Q-factors. The pick-up signal is typically used to keep the tip-sample interaction at a constant level when scanning by feeding it into appropriate regulation software/hardware.

EXAMPLE 2

Quartz tuning forks are mass produced for the electronics industry. Quartz tuning forks with a principal oscillation frequency f=$2^{15}$=32768 Hertz are readily available. I have used one such tuning fork to build a SPM. The tuning fork has dimensions: l=3.9 millimeters, t=600 micrometers and w=400 micrometers. In the finished SPM, the probe head had a resonance sharpness of Q=3000. This results in a highly usable value for the compliance $k_{eff}$=7 N/m.

Probe Head Response

Figure 8A:
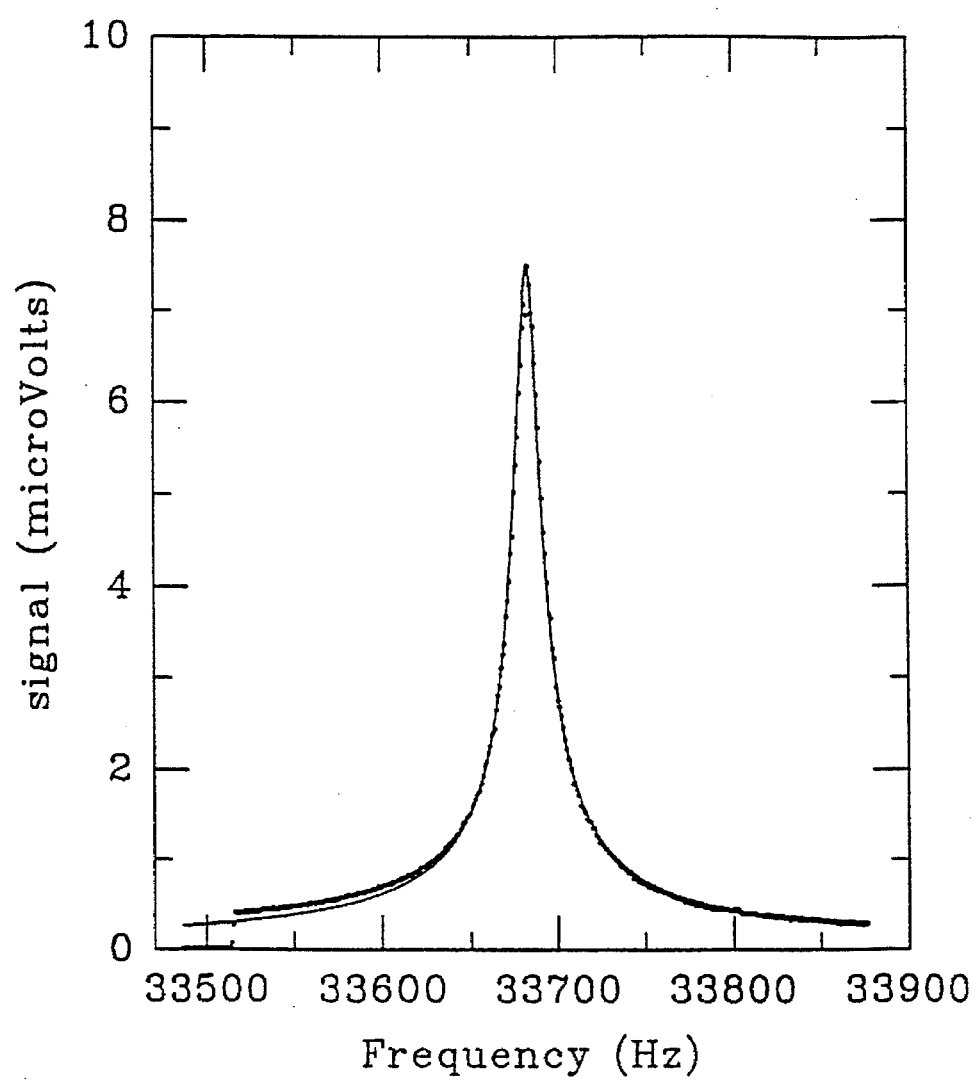
FIGS. 8A, 8B, and 8C Showing various properties of SPMs using a tuning fork in accordance with FIG. 7B with an optical fiber attached to it in the manner of FIG. 4. In each case measurements of the pick-up signal as a function of dither frequency.
Figure 8B:
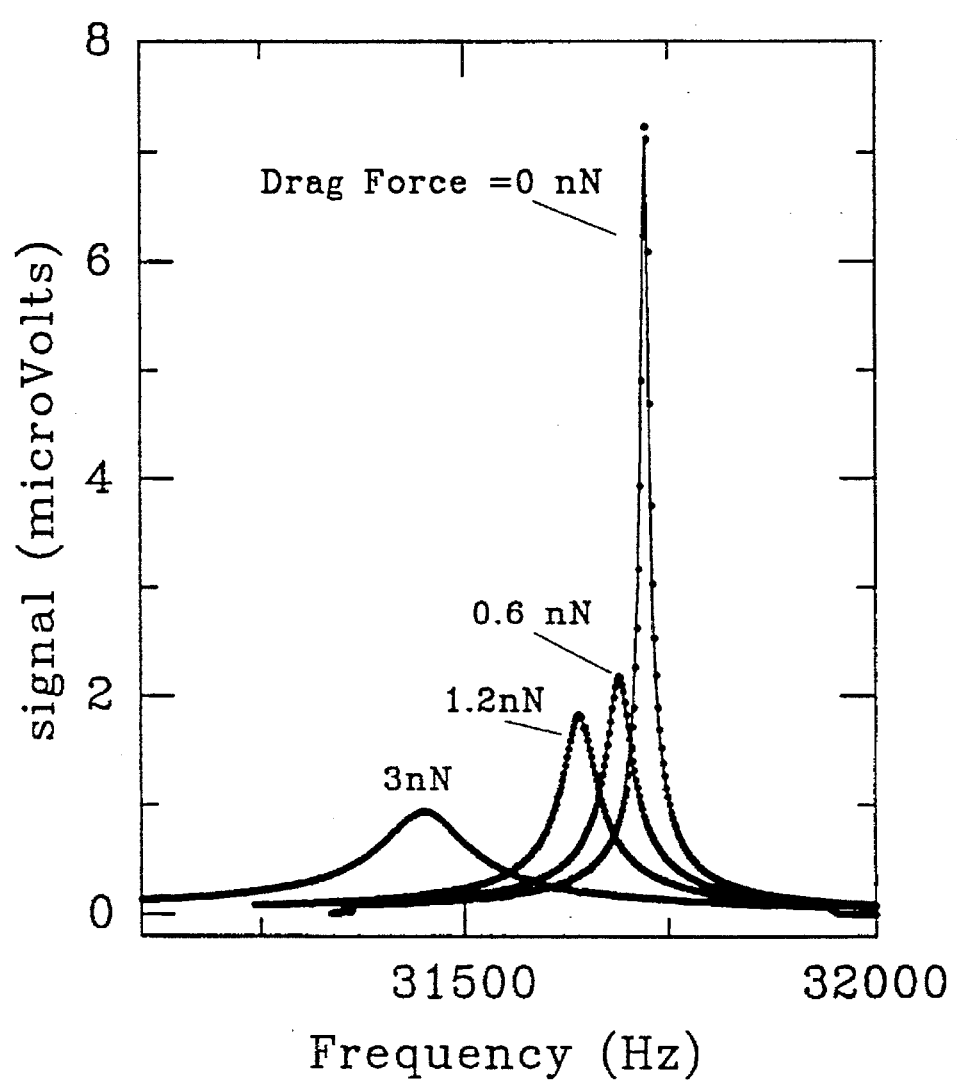
Figure 8C:
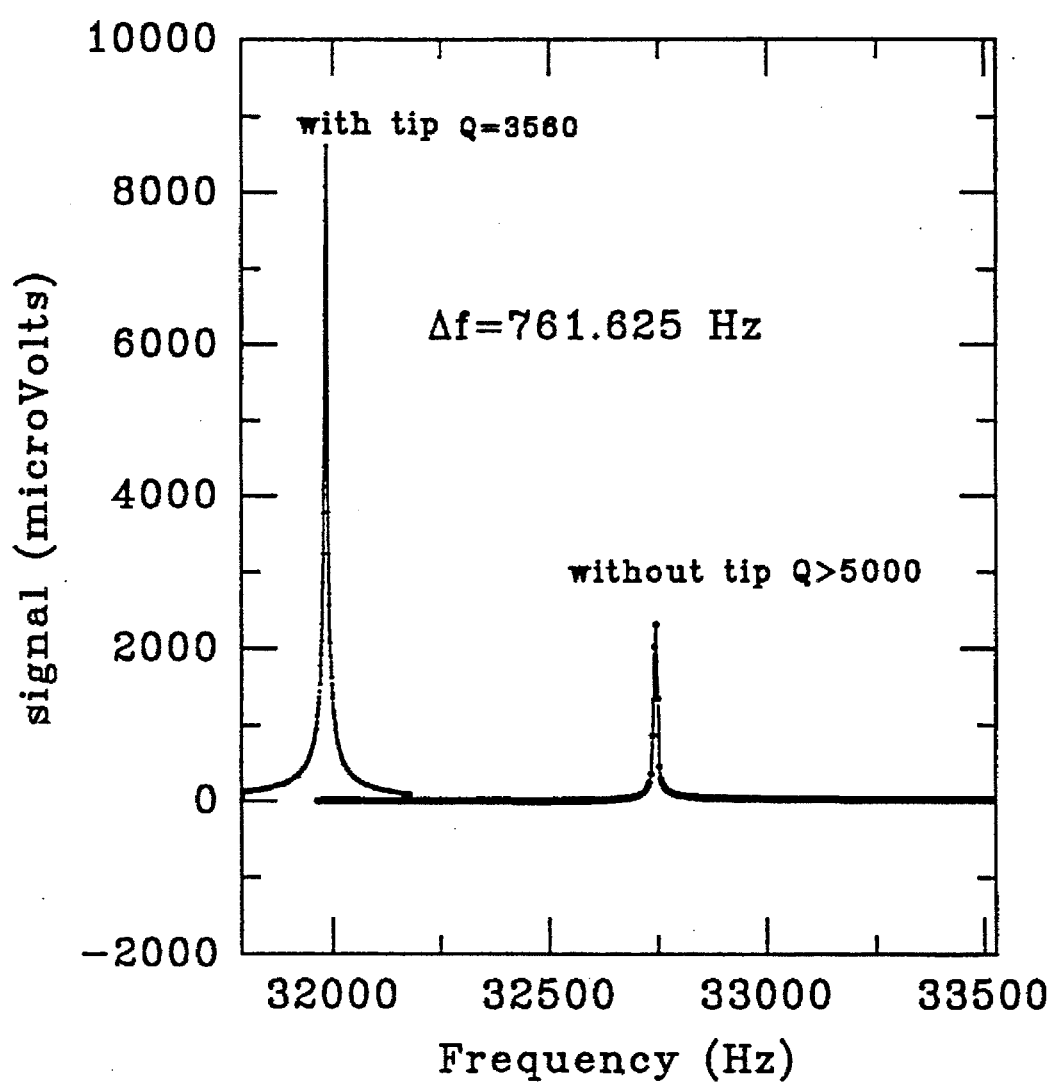

FIGS. 8A, 8B and 8C show signal as a function of dither frequency for an embodiment in which a probe head comprising a tuning fork in accordance with FIG. 7B is used. The tuning fork is attached to a ceramic dither block 50 of the type described in conjunction with FIG. 4. An optical fiber 20 is attached to the tuning fork in the manner shown, for example, in FIG. 4.

The signal measured is the amplitude of the AC voltage picked up from the contacts 40, 41, this signal being induced by the flexure of the prongs of the tuning fork as shown in FIGS. 5A, 5B, and 5C.

In FIG. 8A, the pick-up signal is measured as the dither frequency is varied. The measurement was made in air with the tip piece well away from any sample, i.e. in the absence of tip-sample interaction. In the figure, the points are measured data and the lines fits calculated from a driven harmonic oscillator model. The resonance frequency is measured to be 33683 Hertz and the Q-factor 1410. The frequency resolution is 1.94 Hertz. A peak signal of approximately 7.5 microvolts is measured.

I have found that it is important to select the free length 'p' of protrusion of the tip piece so that the resonance frequency of this free end is higher than that of the tuning fork. This ensures that tip-sample interaction forces are efficiently transferred to the relevant prong of the tuning fork. This is achieved by making the length 'p' sufficiently short. For example, a 'p' of less than 1 millimeter is preferred for an optical fiber with a diameter of 100 micrometers.

FIG. 8B shows the effect of tip-sample interaction on the probe head response. The highest, sharpest peak corresponds to the situation shown in FIG. 8A, namely no tip-sample interaction. The response is then measured with progressively increasing interaction. From right-to-left in the figure the tip-sample drag force or 'friction' is measured at 0, 0.6, 1.2 and 3 nanonewtons, whereby the oscillations become increasingly damped. The points are measured data and the lines fits calculated from a driven harmonic oscillator model. Frequency resolution is 1.94 Hertz.

It can thus be seen that the signal at the peak frequency for no interaction is a sensitive measure of the degree of tip-sample interaction. Moreover, the frequency shift of the response peak with drag force is accompanied by a reduction in the Q-factor so that the signal at the peak frequency for no interaction remains measurable over a wide range of tip-sample drag force. Consequently, a simple, fixed frequency dither is still practical for an SPM in accordance with the invention.

In typical operation, the signal is used to maintain a constant tip-sample distance. Distances in the range of 0 to 200 nanometers are usual.

FIG. 8C shows the effect that bonding the tip piece onto the tuning fork has on the oscillator properties. The right-hand peak shows the tuning fork response prior to bonding the tip piece onto the tuning fork. The measurement system was not accurate enough to measure the Q-factor of the true peak signal value because the resonance is too sharp. However, a lower limit of 5000 can be placed on the Q-factor, this probably being a considerable underestimate. The left-hand peak shows a similar response after bonding of the tip piece onto the same tuning fork, i.e. in an assembled probe head. The Q-factor has reduced to a value of 3560. Frequency resolution 1.94 Hertz.

Tip-sample distance regulation mechanisms

The standard way of regulating tip-sample distance in SPMs is to use the amplitude of the signal, whether it be a tunnel current (STM), atomic force (AFM) or some other convenient scalar quantity in a feed-back loop with a piezo translator which controls the tip-sample distance. Such a way of operating is also suitable for SPMs in accordance with the invention.

However, I have developed another way of regulating tip-sample distance which I believe to be novel and which I therefore now describe in more detail in connection with a contact arrangement as shown in FIG. 7A. The tuning fork, or strictly speaking the probe head since the resonance frequency of the combined tuning fork and tip piece is different from that of the bare tuning fork, is driven on resonance by applying an AC voltage of the appropriate frequency across the contacts 40, 41.

The response of a tuning fork can be considered as electrically equivalent to a capacitance connected in series with a capacitance, inductance and resistance. Moreover, this impedance peaks at the resonance frequency of the tuning fork. Since tip-sample interaction affects the deformation of the tuning fork and induces detuning as shown for example in FIG. 8B, measurement of the impedance of the tuning fork is sensitive to the tip-sample interaction. It is thus possible to use the impedance to regulate the tip-sample distance. For instance, the tip-sample distance can be maintained at a distance defined by a constant impedance value.

Operation of SPMs with integrated dither

An SPM with a contact arrangement as shown in FIG. 7C can be dithered using an external drive circuit (not shown) by applying an AC dither drive input to the contacts 44, 45 with a frequency near to the resonance frequency of the tuning fork.

However, I have developed another way of producing dither for an SPM using a contact arrangement as shown in FIG. 7C which I believe to be novel and which I therefore now describe in more detail. The weak piezoelectric signal sensed by the pick-up electrodes 40, 41 is fed into a voltage amplifier 46 with adjustable gain and/or phase. The output of the amplifier is fed back to the contacts 44, 45 causing the fork to vibrate at its own inherent oscillation frequency. The tuning force is thus used as its own oscillator. The gain and phase of the amplifier are set so that the signal feeds itself in a closed loop.

This way of producing dither is especially advantageous when the resonance sharpness 'Q' exceeds a few thousand as it then becomes increasingly difficult to match an external drive frequency to that of the tuning fork. This is due to small frequency drift occasioned by temperature or pressure changes and also by shifts in the peak resonance frequency caused by tip-sample interaction as shown for example in FIG. 8B. Moreover, the reaction times for such a system can be made less than the oscillation period 1/f thereby allowing fast scanning.

Images

Figure 9A:
FIGS. 9A and 9B Images showing my blood cells taken with the best mode of the SPM of the invention, wherein both FIGS. 9A and 9B were taken simultaneously and wherein the image size is approximately 13 by 13 micrometers.
Figure 9B:

FIGS. 9A and 9B show images of blood cells taken with an SPM of the invention. The image size is approximately 13 by 13 micrometers. FIG. 9A is a topography image taken in FFM mode. FIG. 9B is an optical transmission image taken in NSOM mode. Both images 9A and 9B were taken simultaneously.

Figure 10:
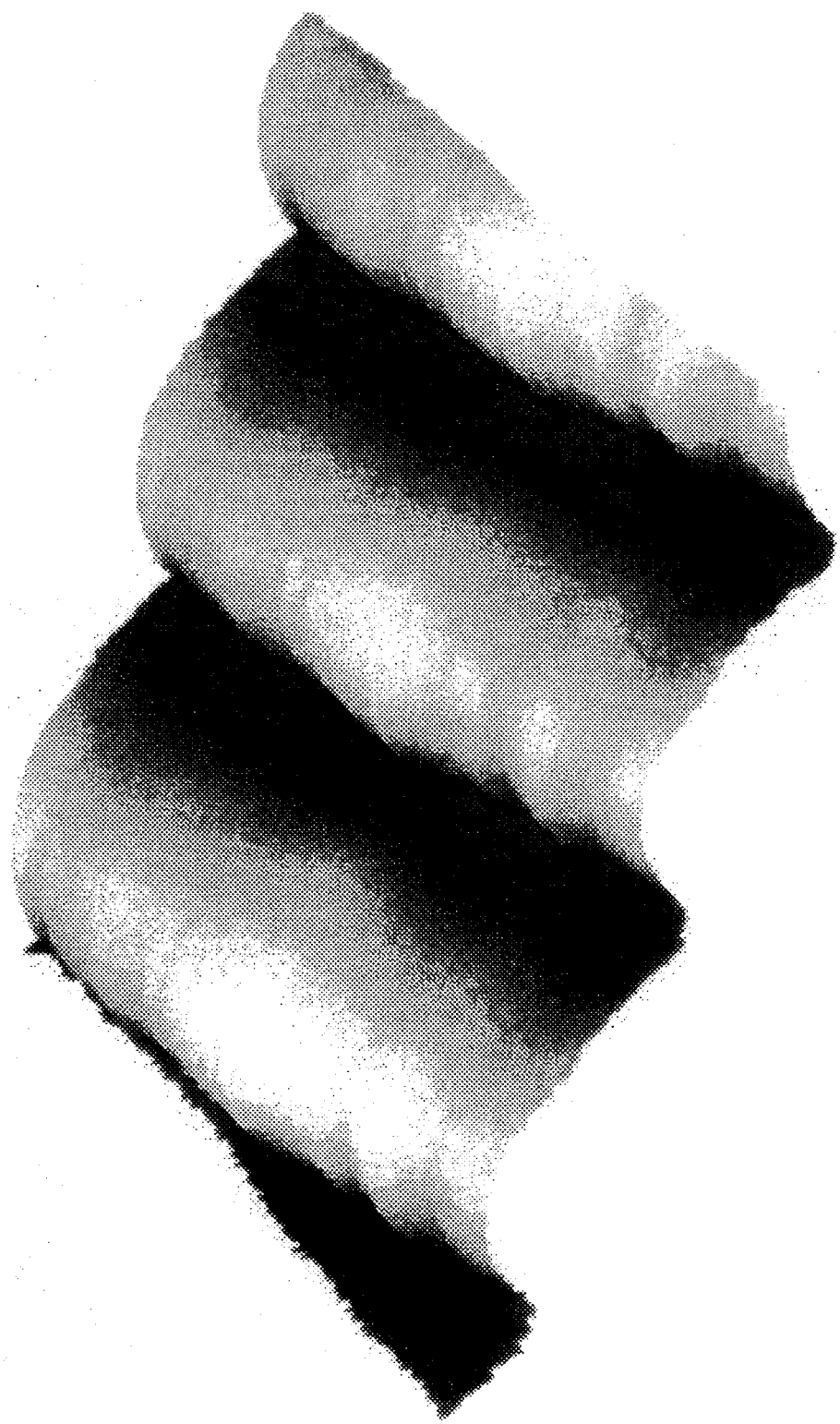
FIG. 10 Image of an optical grating formed on the surface of a piece of gallium arsenide single crystal taken in AFM mode. The areal image size is approximately 1 by 1 micrometer and the vertical scale, i.e. perpendicular to the gallium arsenide surface, has been expanded and amounts to only approximately 90 nanometers.

FIG. 10 is an image of an optical grating formed on the surface of a piece of gallium arsenide single crystal taken in AFM mode. The areal image size is approximately 1 by 1 micrometers and the vertical scale, i.e. perpendicular to the gallium arsenide surface, has been expanded for clarity and amounts to only approximately 90 nanometers.

These two examples were selected as they show the applicability of the SPM of the invention to both biological and semiconductor samples.

Further Embodiments

Figure 6A:
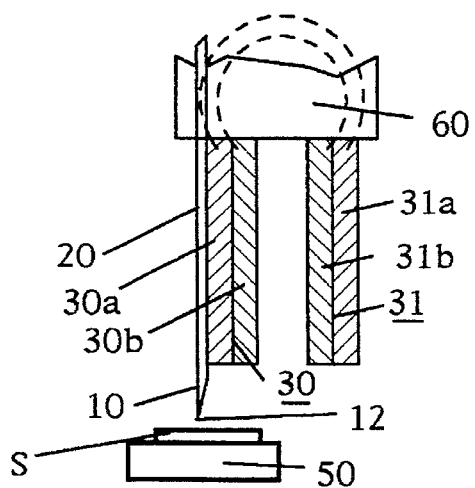
FIGS. 6A and 6B Highly schematic diagrams of a further embodiments of SPMs in accordance with the invention.
Figure 6B:
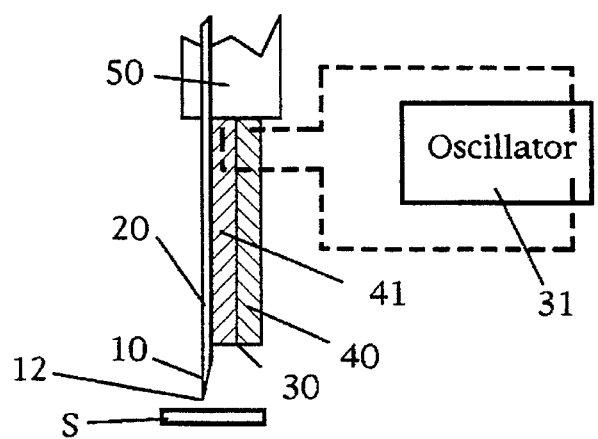

FIGS. 6A and 6B show further embodiments of SPMs in accordance with the invention. The same reference numerals as in FIGS. 4, 7A, 7B and 7C are retained for analogous parts. Only some of the major pans are shown, since these figures are primarily intended to show the principles involved.

FIG. 6A shows an embodiment incorporating an optical fiber 20 in the manner of FIG. 4 but using a twin-bimorph coupled oscillator arrangement. Each arm is a bimorph bar comprising a first strip 30a, 31a of one kind of piezoelectric material bonded together with a second strip 30b, 31b of another kind of piezoelectric material. The individual arms are connected by electrically conducting wires (dashed lines) which serve to couple the mechanical oscillations of the respective arms. Pick-up contacts are not shown to avoid cluttering up the figure. In this embodiment the dither block 50 is placed under the sample S and the part 60 holding the bimorphs together is a simple mounting block. In other words in this embodiment the relative movement between tip and sample is produced by vibrating the sample instead of the tip. Such an arrangement is particularly suited to a mode of use whereby, in the absence of tip-sample interaction, the arms 30, 31 remain still, whereas tip-sample interaction causes the arms to ting, i.e. to start oscillating. To do this the dither frequency should be matched to the natural oscillation frequency of the coupled oscillator arrangement.

FIG. 6B shows an embodiment incorporating an optical fiber 20 bonded to the piezoelectric arm 30 in the manner of FIG. 4. The arm 30 is a single piece of piezoelectric material. This is the first oscillator 30. Instead piezoelectric material to form the second oscillator, an electrical oscillator circuit 31 is provided. The two oscillators 30, 31 are connected by electrically conducting wires (dashed lines) which serve to couple the mechanical oscillations of the arm 30 and the electrical oscillations in the circuit 31. The pick-up contact geometry is not shown to avoid cluttering up the figure. A comparable embodiment could be made wherein the first oscillator is not a single piece of piezoelectric material but a bimorph. An electrical oscillator circuit 31 is used as the second oscillator.

The figures show that different combinations of individual features can to a large extent be chosen at will and that the combinations described up to now do not by any means represent the only possible ones.

I claim:

1. Scanning probe microscope comprising:

a tip piece (10) for interaction with a sample (S);

first displacement means for providing relative movement of the tip piece (10) towards and away from the sample (S) in a first direction (y);

second displacement means for providing relative movement of the tip piece (10) across the sample (S) in a plane (x,z) substantially perpendicular to said first direction (y);

dither means (50) for setting the tip piece (10) into oscillation relative to the sample (S) substantially in a plane (x, z) perpendicular to said first direction (y);

a coupled oscillator arrangement (5) comprising a first oscillator means (30) and a second oscillator means (31) coupled thereto, with said first oscillator means (30) being a first portion of piezoelectric material extending in said first direction (y) having a first end held to a block (50; 60) and a second end remote said block (50; 60) connected with the tip piece (10), the tip piece extending in said first direction (y) beyond said second end of the first portion of piezoelectric material;

pick-up means (40, 41; 40, 41, 43) for obtaining an electrical signal responsive to said interaction with said sample (S) from the coupled oscillator arrangement (5).

2. Scanning probe microscope in accordance with claim 1, wherein the first portion of piezoelectric material (30) is subdivided into at least two connected parts (30a, 30b) with different piezoelectric characters so as to form a bimorph.

3. Scanning probe microscope in accordance with claim 1, wherein the second oscillator means (31) comprises a second portion of piezoelectric material extending in said first direction (y) having a first end held to a block (50; 60) and a second end remote said block (50; 60).

4. Scanning probe microscope in accordance with claim 3, wherein the second portion of piezoelectric material is subdivided into at least two connected parts (31a, 31b) with different piezoelectric characters so as to form a bimorph.

5. Scanning probe microscope according to claim 3, comprising a tuning fork (5) having a first prong, a second prong and a bridging portion forming said first portion of piezoelectric material, said second portion of piezoelectric material and said block respectively.

6. Scanning probe microscope according to claim 3, comprising a tuning fork (5) having a first prong, a second prong and a bridging portion forming said first portion of piezoelectric material, said second portion of piezoelectric material and said block respectively and wherein the dither means (50) is integral with the tuning fork and comprises dither contact means (44, 45) arranged on the tuning fork to which an electrical dither drive input is applicable to deform said first and second prongs (30, 31) of the tuning fork and thereby produce dither.

7. Scanning probe microscope according to claim 3, comprising a tuning fork (5) having a first prong, a second prong and a bridging portion forming said first portion of piezoelectric material, said second portion of piezoelectric material and said block respectively and wherein the dither means (50) comprises a piece of one of the group consisting of ceramic, amorphous and polycrystalline piezoelectric material connected to the tuning fork (5).

8. Scanning probe microscope in accordance with claim 1, wherein the second oscillator means (31) is an oscillator circuit which is electronically coupled to the first oscillator means (30).

9. Scanning probe microscope in accordance with claim 1, wherein the dither means (50) comprises a piece of one of the group consisting of ceramic, amorphous and polycrystalline piezoelectric material connected to said first portion of piezoelectric material.

10. Scanning probe microscope in accordance with claim 1, wherein the dither means (50) is integral with the first portion of piezoelectric material and comprises dither contact means (44, 45) arranged thereon to which an electrical dither drive input is applicable to deform said first portion of piezoelectric material and thereby produce dither.

11. Scanning probe microscope comprising:
an optical fiber (20) having an end forming a tip piece (10) for interaction with a sample (S), with the tip piece (10) terminating in an optically transmissive aperture (12);
first displacement means for providing relative movement of the tip piece (10) towards and away from the sample (S) in a first direction (y);
second displacement means for providing relative movement of the tip piece (10) across the sample (S) in a plane (x,z) substantially perpendicular to said first direction (y);
dither means (50) for setting the tip piece (10) into oscillation relative to the sample (S) substantially in a plane (x, z) perpendicular to said first direction (y);
a coupled oscillator arrangement (5) comprising a first oscillator means (30) and a second oscillator means (31) coupled thereto, with said first oscillator means (30) being a first portion of piezoelectric material extending in said first direction (y) having a first end held to a block (50; 60) and a second end remote said block (50; 60) connected with the tip piece (10), the tip piece extending in said first direction (y) beyond said second end of the first portion of piezoelectric material;
pick-up means (40, 41; 40, 41, 43) for obtaining an electrical signal responsive to said interaction with said sample (S) from the coupled oscillator arrangement (5).

12. Scanning probe microscope in accordance with claim 11, wherein the tip piece (10) has a reflective coating around its optically transmissive aperture (12).

13. Scanning probe microscope in accordance with claim 11, wherein the first portion of piezoelectric material (30) is subdivided into at least two connected parts (30a, 30b) with different piezoelectric characters so as to form a bimorph.

14. Scanning probe microscope in accordance with claim 11, wherein the second oscillator means (31) comprises a second portion of piezoelectric material extending in said first direction (y) having a first end held to a block (50; 60) and a second end remote said block (50; 60).

15. Scanning probe microscope in accordance with claim 11, wherein the second portion of piezoelectric material is subdivided into at least two connected parts (31a, 31b) with different piezoelectric characters so as to form a bimorph.

16. Scanning probe microscope according to claim 14, comprising a tuning fork (5) having a first prong, a second prong and a bridging portion forming said first portion of piezoelectric material, said second portion of piezoelectric material and said block respectively.

17. Scanning probe microscope according to claim 14, comprising a tuning fork (5) having a first prong, a second prong and a bridging portion forming said first portion of piezoelectric material, said second portion of piezoelectric material and said block respectively and wherein the tip piece (10) has a reflective coating around its optically transmissive aperture (12).

18. Scanning probe microscope according to claim 14, comprising a tuning fork (5) having a first prong, a second prong and a bridging portion forming said first portion of piezoelectric material, said second portion of piezoelectric material and said block respectively and wherein the dither means (50) is integral with the tuning fork and comprises dither contact means (44, 45) arranged on the tuning fork to which an electrical dither drive input is applicable to deform said first and second prongs (30, 31) of the tuning fork and thereby produce dither.

19. Scanning probe microscope according to claim 14, comprising a tuning fork (5) having a first prong, a second prong and a bridging portion forming said first portion of piezoelectric material, said second portion of piezoelectric material and said block respectively and wherein the dither means (50) comprises a piece of one of the group consisting of ceramic, amorphous and polycrystalline piezoelectric material connected to the tuning fork (5).

20. Scanning probe microscope according to claim 14, comprising a tuning fork (5) having a first prong, a second prong and a bridging portion forming said first portion of piezoelectric material, said second portion of piezoelectric material and said block respectively, wherein the tip piece (10) has a reflective coating around its optically transmissive aperture (12) and wherein the dither means (50) is integral with the tuning fork and comprises dither contact means (44, 45) arranged on the tuning fork to which an electrical dither drive input is applicable to deform said first and second prongs (30, 31) of the tuning fork and thereby produce dither.

21. Scanning probe microscope according to claim 14, comprising a tuning fork (5) having a first prong, a second prong and a bridging portion forming said first portion of piezoelectric material, said second portion of piezoelectric material and said block respectively, wherein the tip piece (10) has a reflective coating around its optically transmissive aperture (12) and wherein the dither means (50) comprises a piece of one of the group consisting of ceramic, amorphous and polycrystalline piezoelectric material connected to the tuning fork (5).

22. Scanning probe microscope in accordance with any of the claim 11, wherein the second oscillator means (31) is an oscillator circuit which is electronically coupled to the first oscillator means (30).

23. Scanning probe microscope in accordance with claim 11, wherein the dither means (50) comprises a piece of one of the group consisting of ceramic, amorphous and polycrystalline piezoelectric material connected to said first portion of piezoelectric material.

24. Scanning probe microscope in accordance with claim 11, wherein the dither means (50) is integral with the first portion of piezoelectric material and comprises dither contact means (44, 45) arranged thereon to which an electrical dither drive input is applicable to deform said first portion of piezoelectric material and thereby produce dither.

* * * * *